United States Patent [19]
Got et al.

[11] Patent Number: 6,066,278
[45] Date of Patent: May 23, 2000

[54] METHOD OF PRODUCING WOOD FIBER TYPE COMPOSITE MATERIAL PRODUCT HAVING HIGH RIGIDITY AND HIGH HEAT DEFORMATION TEMPERATURE CHARACTERISTICS

[75] Inventors: Fumio Got; Yasumasa Kasahara; Tatsuyuki Ishiura, all of Kurashiki, Japan

[73] Assignee: Namba Press Works Co., Ltd., Kurashiki, Japan

[21] Appl. No.: 09/155,010

[22] PCT Filed: Sep. 24, 1997

[86] PCT No.: PCT/JP97/03395

§ 371 Date: Sep. 23, 1998

§ 102(e) Date: Sep. 23, 1998

[87] PCT Pub. No.: WO98/30378

PCT Pub. Date: Jul. 16, 1998

[30] Foreign Application Priority Data

Jan. 14, 1997 [JP] Japan ...................................... 9-016024

[51] Int. Cl.[7] ........................... B29C 47/00; B29C 45/00; C27N 3/28; C08L 97/02
[52] U.S. Cl. .......................... 264/115; 264/109; 264/122; 524/13; 525/54.3; 525/64
[58] Field of Search ..................................... 264/109, 115, 264/122; 524/13; 525/54.3, 64

[56] References Cited

U.S. PATENT DOCUMENTS 5,574,094  11/1996  Malucelli et al. ...................... 525/54.3

FOREIGN PATENT DOCUMENTS 0 540 026 A1  10/1992  European Pat. Off. .
WO 94/12328  10/1993  WIPO .

OTHER PUBLICATIONS

XP–002092287, May, 24, 1994, Derwent Patent Abstract.
XP–002092288, Jan. 15, 1992, Derwent Patent Abstract.
XP–002092289, Mar. 22, 1994, Derwent Patent Abstract.
XP–002092290, Jan. 10, 1992, Derwent Patent Abstract.
European Patent Application No. 97941223.6, Supplementary European Search Report dated Feb. 4, 1999.

*Primary Examiner*—Mary Lynn Theisen
*Attorney, Agent, or Firm*—Renner, Kenner, Greive, Bobak, Taylor & Weber

[57] ABSTRACT

A method for producing a composite material product which has a high rigidity and a high heat deformation temperature and is mainly composed of a wood cellulose filler and olefin series plastic. Calcium oxide is added to a mixture of a wood cellulose filler crushed into a predetermined size, a granular olefin series plastic material and a rigidity improving agent mainly consisting of polypropylene modified by maleic anhydride or its derivative. An amount of calcium oxide to be added is calculated so that water of the wood cellulose filler becomes finally 2–5% (percent weight). A compound produced by mixing the mixture and calcium oxide is then molded by a molding machine. The polypropylene modified by maleic anhydride has a high degree of modification by maleic anhydride and a small molecular weight.

25 Claims, No Drawings

METHOD OF PRODUCING WOOD FIBER TYPE COMPOSITE MATERIAL PRODUCT HAVING HIGH RIGIDITY AND HIGH HEAT DEFORMATION TEMPERATURE CHARACTERISTICS

FIELD OF THE INVENTION

The present invention relates to a method for producing a composite material mainly composing of a wood cellulose filler and olefin series plastic. In particular, the present invention relates to a method for producing a composite material exhibiting high rigidity and high heat deformation temperature by adding a rigidity improving (or imparting) agent to a mixture of the wood cellulose filler and the olefin series plastic.

TECHNICAL BACKGROUND

A composite material composing of a mixture of a wood cellulose filler, which is produced as a filler by finely crushing a material such as wood, hardboard, pulp or hemp, and a granular olefin series plastic material of polyethylene or polypropylene (PP) is molded by extrusion molding or injection molding, and such a composite material product is widely used as a variety of parts, boards and sheets.

Physical properties, such as flexual strength, flexual modulus, impact strength and heat deformation temperature, of such a composite material can be improved by appropriately selecting a material, a particle size and a mixing amount of the wood cellulose filler, and thus, such a composite material is also used for a variety of interior parts of a car.

However, in such a composite material composing of a mixture of a wood cellulose filler and olefin series plastic, it is known that the rigidity is decreased as the water content thereof is increased, as shown in Table 1. This is because water is excessively produced from the wood cellulose filler by heat produced when the olefin series plastic material contained in the mixture is melted and kneaded and such excessive water reduces the adhesive property between the wood cellulose filler and the olefin series plastic material.

TABLE 1

Physical Properties of Extrusion Molded Sheet of Wood Cellulose Flour (W.C.F)/Plastic Composite Material

| Compositions: | | Standard composition* | |
|---|---|---|---|
| Water content of W.C.F (%): | | 3–5 | 7–8 |
| Strength: | Tensile strength (kg/mm$^2$) | 2.71 | 2.49 |
| | Flexual strength (kg/mm$^2$) | 4.61 | 4.12 |
| | Flexual modulus (kg/mm$^2$) | 443 | 394 |

*Standard composition = PP:W.C.F:Recycled composite material = 2:2:1

In order not to reduce the adhesive property therebetween and in order to improve the physical properties described above, it is necessary to dry in advance the wood cellulose filler to 3–4% water content so as to keep the water content below 5% when mixing. If a recycled composite material, which includes the same components as a composite material to be produced, is used to produce the composite material, the recycled composite material is crushed in a predetermined size and the crushed recycled composite material is used as one component of the composite material. In this case, it is necessary to dry a wood cellulose filler materials included in the recycled composite material into 5% water content.

The olefin series plastic is commonly used as a matrix of the composite material. However, the olefin series plastic is chemically inert (i.e. not polarizable) and is less affinity. Thus, an essentially good adhesive property between the matrix and the wood cellulose filler can not be achieved. That is, the improvement of the physical properties of the molded product of such a composite material is limited. In order to improve the adhesive property of the olefin series plastic which is chemically inert and is less affinity, in practice, polypropylene modified by maleic anhydride having a low degree of modification by maleic anhydride and a large molecular weight is used as an additive (a rigidity improving agent) for improving the adhesive property therebetween.

By adding such a rigidity improving agent (2–7%) to a mixture of olefin series plastic and a filler consisting of glassfiber, talc, calcium carbonate and the like, a composite material having improved rigidity and heat-resisting property can be obtained, and such a rigidity improving agent is also used for a composite material consisting a wood cellulose filler.

The polypropylene modified by maleic anhydride serves to give a certain measure of polarity for the olefin series plastic which has little polarity and to increase the affinity against the filler so as to make higher the adhesive property therebetween, and as a result, the rigidity and the heat-resisting property of the composite material are improved (see Commercial Product A in Table 2 below).

The polypropylene modified by maleic anhydride used as an additive for improving the rigidity has a low degree of modification by maleic anhydride. However, the molecular weight thereof is large, and thereby it is very expensive.

As described above, in order to improve the physical properties, the wood cellulose filler should be dried to 3–4% water content, and if a recycled composite material (leavings or scraps of the composite material) is used, the wood cellulose filler contained in the recycled composite material should be dried to 5% water content. Such a dry process needs a special drying process, and this causes the cost of the composite material (the material cost in the unit cost of production is high) to increase, and as a result, it is extremely limited to use it.

The polypropylene modified by maleic anhydride having a low degree of modification by maleic anhydride serves to improve the rigidity. However, its large molecular weight influences the elastic fluidity of a melt thereof. That is, the extrusion molding ability of a composite material including it is much lower than that of a composite material which does not include it, so that a thickness of the molded product can not be uniform and it is difficult to adjust the thickness.

Other than polypropylene modified by maleic anhydride described above, polypropylene modified by maleic anhydride having a relatively high degree of modification by maleic anhydride and a small molecular weight is commercially available as a rigidity improving agent. The cost of this agent is about half of the rigidity improving agent described before.

However, each of physical properties such as flexual strength, flexual modulus, impact strength and heat deformation temperature of a composite material (Commercial Product B in Table 2), which is produced by adding the polypropylene modified by maleic anhydride having a high degree of modification by maleic anhydride and a small molecular weight, is worse than each of the corresponding physical properties of a composite material (Commercial Product A in Table 2), which is produced by adding the polypropylene modified by maleic anhydride having a low degree of modification by maleic anhydride and a large molecular weight. This is because the molecular weight of the former is lower than that of the later so that the adhesive property between the wood cellulose filler and the olefin series plastic is reduced by water produced from the wood cellulose filler.

Therefore, the present invention is made to solve problems described above, and an object thereof is to provide a method for producing a composite material product having high rigidity and high heat deformation temperature mainly composing of a wood cellulose filler and olefin series plastic by use of a cheap rigidity improving agent.

Another object of the present invention is to provide a method for producing such a composite material product in which a special drying process does not need for the wood cellulose filler to be mixed.

Still another object of the present invention is to provide a method for producing such a composite material product in which the elastic fluidity in the molding process is good to mold into a predetermined product.

DISCLOSURE OF THE INVENTION

The present invention is a method for producing a composite material product, which is mainly composed of a wood cellulose filler and olefin series plastic and has high rigidity and high heat deformation temperature. In accordance with the present invention, calcium oxide is added to a mixture of a wood cellulose filler finely crushed in a predetermined size, a granular olefin series plastic material and a rigidity improving agent mainly consisting of polypropylene modified by maleic anhydride or its derivative. The amount of calcium oxide to be added is calculated so that water of the wood cellulose filler becomes finally 2–5%. Then, a compound produced by adding calcium oxide to the mixture is molded by a molding machine.

It is desirable that the molding is carried out by a molding machine in which the compound is directly melted and kneaded. If all or a part of the mixture with calcium oxide is pelletized in advance by a pelletizer, it is desirable that the molding is carried out by injection or extrusion molding.

In another method of the present invention for producing a composite material product, which is mainly composed of a wood cellulose filler and olefin series plastic and has high rigidity and high heat deformation temperature, a mixture of a rigidity improving agent and calcium oxide is added to a mixture of a wood cellulose filler finely crushed in a predetermined size and a granular olefin series plastic material. The rigidity improving agent is mainly consisted of polypropylene modified by maleic anhydride or its; derivative. The amount of calcium oxide to be mixed is calculated so that water of the wood cellulose filler becomes finally 2–5%. Then, a compound produced by mixing those mixtures is molded by a molding machine.

If all or a part of the mixture of the rigidity improving agent and calcium oxide is pelletized in advance by a pelletizer, it is desirable that the molding is carried out by injection or extrusion molding.

In still another method of the present invention for producing a composite material product, which is mainly composed of a wood cellulose filler and olefin series plastic and has high rigidity and high heat deformation temperature, a rigidity improving agent is added to a mixture of a wood cellulose filler finely crushed in a predetermined size, a granular olefin series plastic material and calcium oxide. The rigidity improving agent is mainly consisted of polypropylene modified by maleic anhydride or its derivative. The amount of calcium oxide to be mixed is calculated so that water of the wood cellulose filler becomes finally 2–5%. Then, a compound produced by adding the rigidity improving agent to the mixture is molded by a molding machine.

If all or a part of the mixture is pelletized in advance by a pelletizer, it is desirable that the molding is carried out by injection molding or extrusion molding.

The polypropylene modified by maleic anhydride used in those methods of the present invention has a high degree of modification by maleic anhydride and a small molecular weight.

The polypropylene modified by maleic anhydride mixed in the composite material serves to polarize the olefin series plastic and to improve the affinity between the wood cellulose filler and the olefin series plastic so that the adhesive property therebetween is promoted. Calcium oxide mixed in the composite material is chemically reacted with water produced from the wood cellulose filler to generate a basic calcium hydroxide and simultaneously to neutralize acid components including in the water so that a condition of contact surface between the wood cellulose filler and the olefin series plastic material is changed so as to promote the adhesive property therebetween.

The polypropylene modified by maleic anhydride used in those methods of the present invention has a high degree of modification be maleic anhydride and a small molecular weight, and thus, the viscosity of a melt thereof is low. Thus, the fluidity of a melted compound including components of the composite material is improved so as to improve the molding ability of the composite material, and thereby the productivity is improved.

DETAILED DESCRIPTION OF THE INVENTION

To carry out the present invention, firstly, a wood cellulose filler finely crushed in a predetermined size and a granular olefin series plastic material are provided. The wood cellulose filler used in the present invention is a material crushed in a predetermined size and this material is, in preferable, a natural material selected from the group consisting of wood, hardboard, pulp and hemp or a processed material mainly consisting of the natural material. A preferred size thereof is 40–80 mesh.

In production of a composite material of the present invention, a recycled composite material which is crushed in advance can be added as a part of the composite material. As such a recycled composite material, a composite material produced in accordance with a method of the present invention described below can be used, and in alternative, a composite material (which may be leavings produced during extraction molding or scraps) of the art including the same wood cellulose filler and the same olefin series plastic as the composite material to be produced can be used. Such an addition can improve the extruding ability.

A composite material product is produced as described below. Calcium oxide is mixed with a mixture of the wood cellulose filler crushed, the olefin series plastic and a rigidity improving agent mainly consisting of polypropylene modified by maleic anhydride or its derivative. The polypropylene modified by maleic anhydride has a relatively high degree of modification by maleic anhydride and a small molecular weight. A compound is produced by mixing the mixture and calcium oxide for a predetermined period of time in, for example, a Henschel mixer. Then, the compound is transferred to a hopper and is extruded in a predetermined thickness by use of an extrusion molding machine.

An amount of the wood cellulose filler to be mixed and a crushed size thereof influence several physical properties as described before and are determined so as to yield desired physical properties.

An amount of the rigidity improving agent to be added depends on the amount of the wood cellulose filler to be mixed and the crushed size thereof. In general, the rigidity improving agent is preferably 4–7 weight by parts, more preferably 5–6 weight by parts, when the olefin series plastic is 100 weight by parts, if the amount of the wood cellulose filler is 50 wt %. The molecular weight of the rigidity improving agent is desirably below 50000, more desirably below 20000. The viscosity of a melt of the rigidity improving agent is desirably below 17000 cps at 160° C., more desirably below 8000 cps at 160° C. The acid number of the rigid improving agent is desirably more than 20 mgKOH/g.

Calcium oxide to be used is generally a flour and has high water absorption, and thus, it is desirable that at least a part thereof undergoes a surface treatment. The amount of calcium oxide is calculated so that water of the wood cellulose filler becomes finally 2– 5% (percent by weight), preferably 3–4% (percent by weight).

Water is produced from the wood cellulose filler by heat produced when the mixture with calcium oxide is directly melted and kneaded in the molding process. Calcium oxide to be added is chemically reacted with the water as described below to generate calcium hydroxide.

$$CaO + H_2O = Ca(OH)_2$$
$$(56) \quad (18) \quad (74)$$

It is noted that if the calcium oxide is excessively added to the mixture so as to leave a large quantity of the non-reacted calcium oxide, the non-reacted calcium oxide absorbs water contained in air and is chemically reacted therewith after completing the molding so that the resulting composite material is deformed to change its dimension. If the calcium oxide is shortly added to the mixture, the water content as described above can not be achieved, and thereby a desired effect can not be exhibited. Thus, in the present invention, the amount of calcium oxide to be added is very important.

Calcium hydroxide generated as describe above serves to neutralize acid components included in the water, and as a result, a function of the polypropylene modified by maleic anhydride is promoted so as to polarize the olefin series plastic to increase the adhesive property between the wood cellulose filler and the olefin series plastic.

However, an amount of the generated calcium hydroxide in the composite material should be controlled below 12% of the total weight, preferably below 10% of the total weight. If it exceeds this range, the impact strength is reduced, and thereby the rigidity improving effect is considerably reduced.

Table 2 shows comparable physical properties of each of a standard composite material (which is composed in a standard composition and has no rigidity improving agent), a composite material (Commercial Product A) (a rigidity improving agent is added, the rigidity improving agent of polypropylene modified by maleic anhydride having a low degree of modification by maleic anhydride and a large molecular weight), a composite material (Commercial Product B) (a rigidity improving agent is added, the rigidity improving agent of polypropylene modified by malefic anhydride having a high degree of modification by maleic anhydride and a small molecular weight) and a composite material of the present invention (surface treated calcium oxide flour is further added to Commercial Product B).

TABLE 2

Physical Properties of Extrusion Molded Board of Composite Material of Wood cellulose Flour and Plastic

| Test Items | Composite material Standard composition*1 No additive | Composite materials adding a rigidity improving agent | | |
| --- | --- | --- | --- | --- |
| | | Commercial Product A | Commercial Product B | Commercial Product B plus Calcium oxide*2 |
| Flexual Strength (kg/mm²) | 4.86 | 5.94 | 5.34 | 6.06 |
| Flexual modulus (kg/mm²) | 441 | 519 | 471 | 539 |
| Impact strength (kg/mm²) (Chapy) | 2.93 | 3.05 | 2.95 | 3.09 |
| Heat Deformation Temperature (° C.) (18.5 kg/mm²) | 116 | 123 | 120 | 124 |

*1 . . . PP:wood flour:recycled composite material = 2:2:1
Commercial Product A: A rigidity improving agent is added. The rigidity improving agent of polypropylene modified by maleic anhydride has a low degree of modification by maleic anhydride and a large molecular weight.
Commercial Product B: A rigidity improving agent is added. The rigidity improving agent of polypropylene modified by maleic anhydride has a high degree of modification by maleic anhydride and a small molecular weight.
*2 . . . Surface treated calcium oxide flour As seen by Table 2, All physical properties of the composite material of the present invention are better than those of the standard composite material (which is composed in a standard composition and has no rigidity improving agent) and those of the composite material (Commercial Product B) (a rigidity improving agent is added, the rigidity improving agent of polypropylene modified by maleic anhydride having a high degree of modification by maleic anhydride and a small molecular weight) and are similar to or better than those of the composite material (Commercial Product A) (a rigidity improving agent is added, the rigidity improving agent of polypropylene modified by maleic anhydride having a low degree of modification by maleic anhydride and a large molecular weight).

In an aspect of the method of the present invention described above, calcium oxide is added to the mixture of the wood cellulose filler, the olefin series plastic and the polypropylene modified by maleic anhydride and the mixture with calcium oxide is then directly melted and kneaded to produce a compound. In this aspect, all or a part of the compound may be pelletized in advance by a pelletizer and the compound is then molded by injection or extrusion molding.

As another aspect of the present invention, all or a part of a mixture of the rigid improving agent and calcium oxide is pelletized in advance by a pelletizer, and a compound is produced by mixing the pelletized mixture and a mixture of the wood cellulose filler and the granular olefin series plastic material and is molded by injection molding or extrusion molding.

As still another aspect of the present invention, all or a part of a mixture of the wood cellulose filler, the olefin series plastic and the calcium oxide are pelletized in advance by use of a pelletizer, and a compound is produced by mixing the pelletized mixture and the rigid improving agent and is then molded by use of an injection molding or extrusion molding.

We now describe in detail a method of the present invention for producing a composite material by use of both of an absorbent of calcium oxide and a rigid improving agent of polypropylene modified by maleic anhydride having a high degree of modification by maleic anhydride and a small molecular weight.

A dried wood flour (which is crushed into 50–80 mesh and has 5% water content), a polypropylene granule (which is one of olefin series plastics), a recycled material (which is a recycled composite material composing of a wood flour with 7% water content and polypropylene and is crushed into a similar size to the dried wood flour), a rigid improving agent (which is polypropylene modified by maleic anhydride (Yumex1010™) having a high degree of modification by maleic anhydride and a small molecular weight) and calcium oxide (CML#35™) are introduced in a Henschel mixer. Each quantity thereof is listed below.

| | |
|---|---|
| Wood flour | 100 weight by parts |
| Polypropylene | 100 weight by parts |
| Recycled composite material | 50 weight by parts |
| Rigid improving agent (Yumex1010)* | 5 weight by parts |
| Absorbent (CML#35)** | 7.5 weight by parts |

*SANYO KASEI Co., Ltd.
**SHIRAISHI CALCIUM Co., Ltd.

Those are mixed in the Henschel mixer for 10–15 minutes, and the mixture is then transferred to a hopper of an extrusion molding machine and is extruded at 180–230° C., and as a result, a plate with 2.0 mm thick is fabricated. The plate produced by such a method has physical properties (i.e. high rigidity and high heat deformation temperature) shown in Table 2. By use of a stamping molding technique, a rear shelf as one of parts of a car can be produced from this plate.

A composite material produced in accordance with the present invention has the same impact strength as a composite material produced by adding a rigid improving agent which is used in the art and exhibits a high rigid improving effect, and the composite material according to the present invention has better physical properties in rigidity and heat deformation temperature than the composite material according to the art.

Moreover, a rigid improving agent used in the present invention has been hardly used in the art and is very cheap. Also, calcium oxide used therewith is cheap. In addition, equipments used in the art can be used, and a special drying process is not necessary for a wood cellulose filler. Thus, In accordance with a method of the present invention, a production cost for a composite material can be greatly reduced.

Furthermore, a molecular weight of polypropylene modified by maleic anhydride (having a high degree of modification by maleic anhydride) used as a rigid improving agent in the present invention is smaller than that of a rigid improving agent used in the art, and thus, the elastic fluidity of a mixture melted in the molding process is better than that of a mixture using a rigid improving agent of the art, so that the good elastic fluidity is secured, a resulting product can be molded into a predetermined shape and a dimension of the product is easily adjusted.

What is claimed is:

1. A method for producing a composite material product, which has a high rigidity and a high heat deformation temperature, mainly composing of a wood cellulose filler and olefin series plastic, said method comprising the steps of:

adding calcium oxide with a mixture of a wood cellulose filler crushed into a predetermined size, a granular olefin series plastic material and a rigidity improving agent mainly consisting of polypropylene modified by maleic anhydride or its derivative, an amount of said calcium oxide to be added being calculated so that water of said wood cellulose filler becomes finally 2–5% (percent weight); and molding a compound produced by adding said calcium oxide to said mixture, by use of a molding machine, wherein said polypropylene modified by maleic anhydride has a high degree of modification by maleic anhydride and a small molecular weight.

2. The method of claim 1, wherein at least a part of said calcium oxide undergoes a surface treatment.

3. The method of claim 1 or 2, wherein said step of molding by use of a molding machine comprises directly melting and kneading said mixture with said calcium oxide.

4. The method of claim 1 or 2, wherein all or a part of said mixture with said calcium oxide is pelletized in advance by a pelltizer.

5. The method of claim 4, wherein said molding by use of a molding machine is carried out by injection or extrusion molding.

6. A method for producing a composite material product, which has a high rigidity and a high heat deformation temperature, mainly composing of wood cellulose filler and an olefin series plastic, said method comprising the steps of:

adding a mixture of calcium oxide and a rigidity improving agent to a mixture of wood cellulose filler crushed into a predetermined size and a granular olefin series plastic material, said rigidity improving agent mainly consisting of polypropylene modified by maleic anhydride or its derivative, an amount of said calcium oxide to be added being calculated so that water of said wood cellulose filler becomes finally 2–5% (percent weight); and molding a compound produced by mixing those mixtures, by use of a molding machine, wherein said polypropylene modified by maleic anhydride has a high degree of modification by maleic anhydride and a small molecular weight.

7. The method of claim 6, wherein at least a part of said calcium oxide undergoes a surface treatment.

8. The method of claim 6 or 7, wherein all or a part of said mixture of said calcium oxide and said rigidity improving agent are pelletized in advance by a pelletizer.

9. The method of claim 8, wherein said molding by use of a molding machine is an injection molding or an extrusion molding.

10. A method for producing a composite material product, which has a high rigidity and a high heat deformation temperature, mainly composing of wood cellulose filler and an olefin series plastic, said method comprising the steps of:

adding a rigidity improving agent to a mixture of wood cellulose filler crushed into a predetermined size, a granular olefin series; plastic and calcium oxide, said rigidity improving agent mainly consisting of polypropylene modified by maleic anhydride or its derivative, an amount of said calcium oxide to be added being calculated so that water of said wood cellulose filler becomes finally 2–5% (percent weight); and molding a compound produced by adding said rigidity improving agent to said mixture, by use of a molding machine, wherein said polypropylene modified by maleic anhydride has a high degree of modification by maleic anhydride and a small molecular weight.

11. The method of claim 10, wherein all or a part of said calcium oxide undergoes a surface treatment.

12. The method of claim 10 or 11, wherein all or a part of said mixture are pelletized in advance by a pelletizer.

13. The method of claim 12, wherein said molding by use of a molding machine is carried out by injection or extrusion molding.

14. The method of claim 1, 6 or 10, further including a recycled composite material crushed into a predetermined size.

15. The method of claim 1, 6 or 10, wherein an amount of said calcium is a predetermined amount calculated so that a final water content of the wood cellulose filler becomes 3–4 wt %.

16. The method of claim 1, 6 or 10, wherein an amount of said calcium oxide is determined such that an amount of calcium hydroxide generated by reacting with water does not exceed 12% of a total weight of the product.

17. The method of claim 1, 6 or 10, wherein said an amount of said calcium is determined such that an amount of calcium hydroxide generated by chemically reacting with water does not exceed 10 wt % of the product.

18. The method of claim 1, 6 or 10, wherein a molecular weight of said rigidity improving agent is below 50000.

19. The method of claim 1, 6 or 10, wherein said a molecular weight of said rigidity improving agent is below 20000.

20. The method of claim 1, 6 or 10, wherein the viscosity of a melt of said rigidity improving agent is below 17000 cps at 160° C.

21. The method of claim 1, 6 or 10, wherein the viscosity of a melt of said rigidity improving agent is below 8000 cps at 160° C.

22. The method of 1, 6 or 10, wherein the acid number of said rigidity improving agent is more than 20 mgKOH/g.

23. The method of claim 1, 6 or 10, wherein said wood cellulose filler is a material produced by crushing a natural material selected from the group consisting of wood, pulp and hemp or a processed material mainly consisting of said natural material into a predetermined size.

24. The method of claim 1, 6 or 10, wherein an amount of said rigidity improving agent to be added is 4–7 weight by parts when an amount of said olefin series plastic material is 100 weight by parts, if the wood cellulose filler 50 wt % is included therein.

25. The method of claim 1, 6 or 10, wherein an amount of said rigidity improving agent to be added is 5–6 weight by parts when an amount of said olefin series plastic material is 100 weight by parts, if the wood cellulose filler 50 wt % is included therein.

* * * * *